United States Patent [19]
Brinker et al.

[11] Patent Number: 5,102,292
[45] Date of Patent: Apr. 7, 1992

[54] APPARATUS FOR UNLOADING BLOCKS OF BLANKS STACKED ON PALLETS

[75] Inventors: Alfred Brinker, Gevelsberg; Gerd-Georg Kwauka, Gütersloh, both of Fed. Rep. of Germany

[73] Assignee: Niepmann Traylift Transportsysteme GmbH & Co. KG, Gevelsberg, Fed. Rep. of Germany

[21] Appl. No.: 726,291

[22] Filed: Jul. 5, 1991

Related U.S. Application Data

[62] Division of Ser. No. 421,070, Oct. 13, 1989, Pat. No. 5,040,942.

[30] Foreign Application Priority Data

Oct. 14, 1988 [DE] Fed. Rep. of Germany ....... 3835032

[51] Int. Cl.⁵ .............................................. B65G 59/02
[52] U.S. Cl. ................................ 414/796; 414/796.6; 414/907
[58] Field of Search ............... 414/795.4, 795.7, 795.9, 414/796, 796.1, 796.2, 796.6, 798.2, 796.5, 907, 931, 929, 417, 621, 622, 626; 294/907

[56] References Cited

U.S. PATENT DOCUMENTS

| | | | |
|---|---|---|---|
| 4,551,053 | 11/1985 | Ishibashi | 414/796 |
| 4,671,723 | 6/1987 | Feldkämper | 414/796 |
| 4,746,255 | 5/1988 | Roccabianca et al. | 414/793.8 |
| 4,787,810 | 11/1988 | Cawley et al. | 414/672 X |
| 4,789,295 | 12/1988 | Boucher, Jr. et al. | 294/907 X |
| 4,911,608 | 3/1990 | Krappitz et al. | 414/796 |

Primary Examiner—Robert J. Spar
Assistant Examiner—James T. Eller, Jr.
Attorney, Agent, or Firm—Robert W. Becker & Associates

[57] ABSTRACT

An apparatus for unloading blanks of paper, cardboard, plastic, etc. that are stacked as blocks on a pallet and that are subsequently supplied as blocks of blanks for further processing or temporary storage includes a slightly pivotable insertion tool as well as structural elements for moving those stacks or blocks of blanks, relative to their support, that are disposed on the pallet at the edge thereof. The individual blocks of blanks are successively lifted from their support via an insertion tool, with a pressure foot preventing an undesired shifting and a holding foot securing the position of the respective block of blanks on the insertion tool.

13 Claims, 7 Drawing Sheets

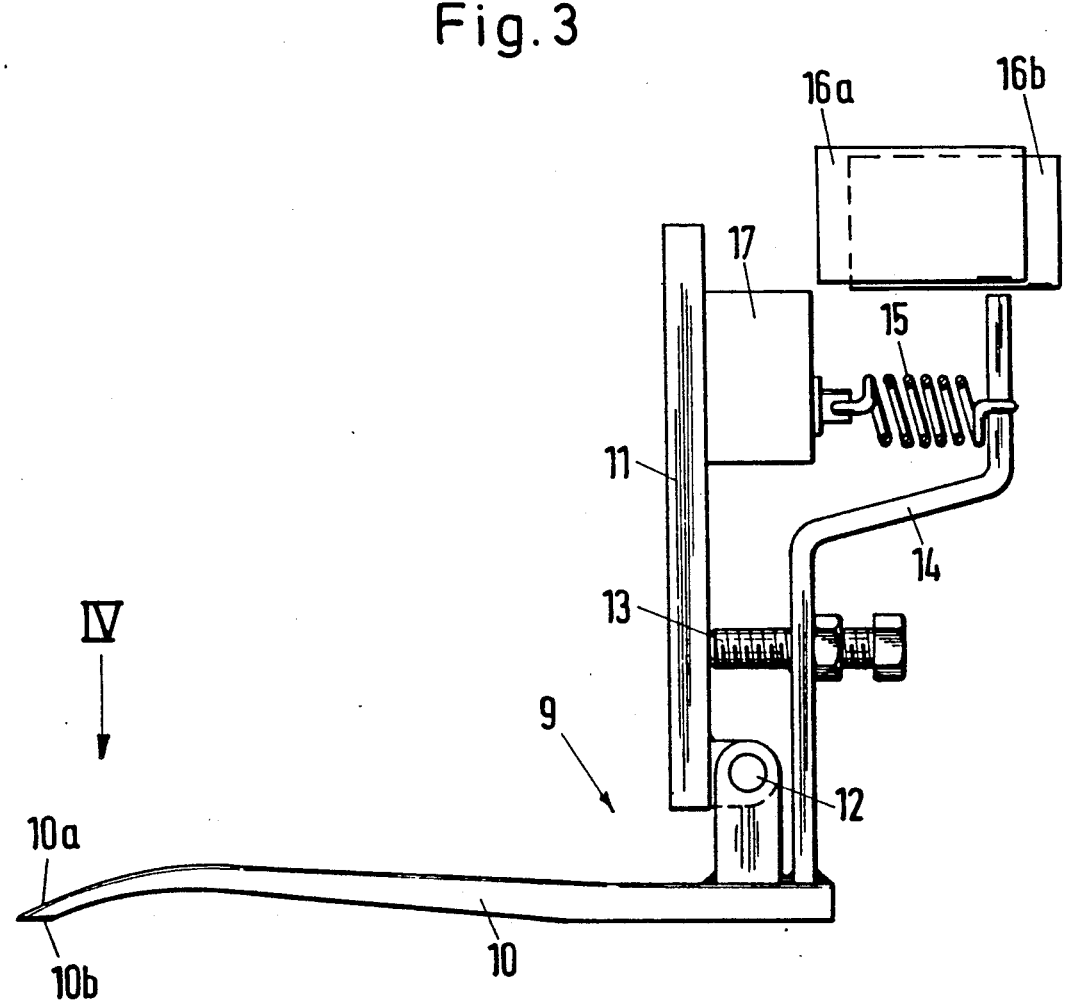

APPARATUS FOR UNLOADING BLOCKS OF BLANKS STACKED ON PALLETS

This is a divisional application of Ser. No. 421,070 filed Oct. 13, 1989, now U.S. Pat. No. 5,040,942.

BACKGROUND OF THE INVENTION

The present invention relates to a method and apparatus for unloading blanks of paper, cardboard, plastic, etc. that are stacked as blocks on a pallet and that are subsequently supplied as blocks of blanks for further processing or temporary storage.

Large quantities of paper or cardboard blanks are processed by many packaging machines, especially cigarette packaging machines and folding box gluing machines. Such machines are constantly being made more efficient, so that frequently increases in efficiency and output are expedient only if the problem of supplying these machines with blanks could also be satisfactorily resolved. For this purpose, the stack of blanks should be delivered to the machines on pallets.

Methods and apparatus are known where the blanks that are to be processed are supplied to the machines in stacks. However, in this connection it is necessary that special cassettes, boxes, or similar auxiliary means be used for the individual stack of blanks, or band the same in stacks in a particular manner, so that these stacks can be supplied in an orderly manner to the respective machine. Furthermore, special intermediate layers are known for the blanks that are stacked on a pallet, with these special intermediate layers being provided with openings through which a gripping mechanism can extend for removing the individual stack of blanks.

These special auxiliary means or additional measures represent for a customer undue limitations that not only increase the complexity and hence the costs, but also limit the efficiency of the machines. For this reason, experiments have been undertaken to try to remove blanks stacked on a pallet from above in a flake-like manner via friction elements. However, these experiments have not led to usable results, because the function of such measures cannot be satisfactorily guaranteed due to the danger that the blanks catch on one another.

It is therefore an object of the present invention to provide a method and apparatus of the aforementioned general type via which the blanks, such as cigarette packaging blanks and folding box blanks of all types, which are stacked as blocks on a pallet, can be removed as individual blocks of blanks without having to use expensive specialized equipment, specialized containers, or special intermediate layers.

BRIEF DESCRIPTION OF THE DRAWINGS

This object, and other objects and advantages of the present invention, will appear more clearly from the following specification in conjunction with the accompanying schematic drawings, in which:

FIG. 3 is a side view of the insertion tool that is disposed on the pick-up head of FIG. 2;

SUMMARY OF THE INVENTION

Figure 1:
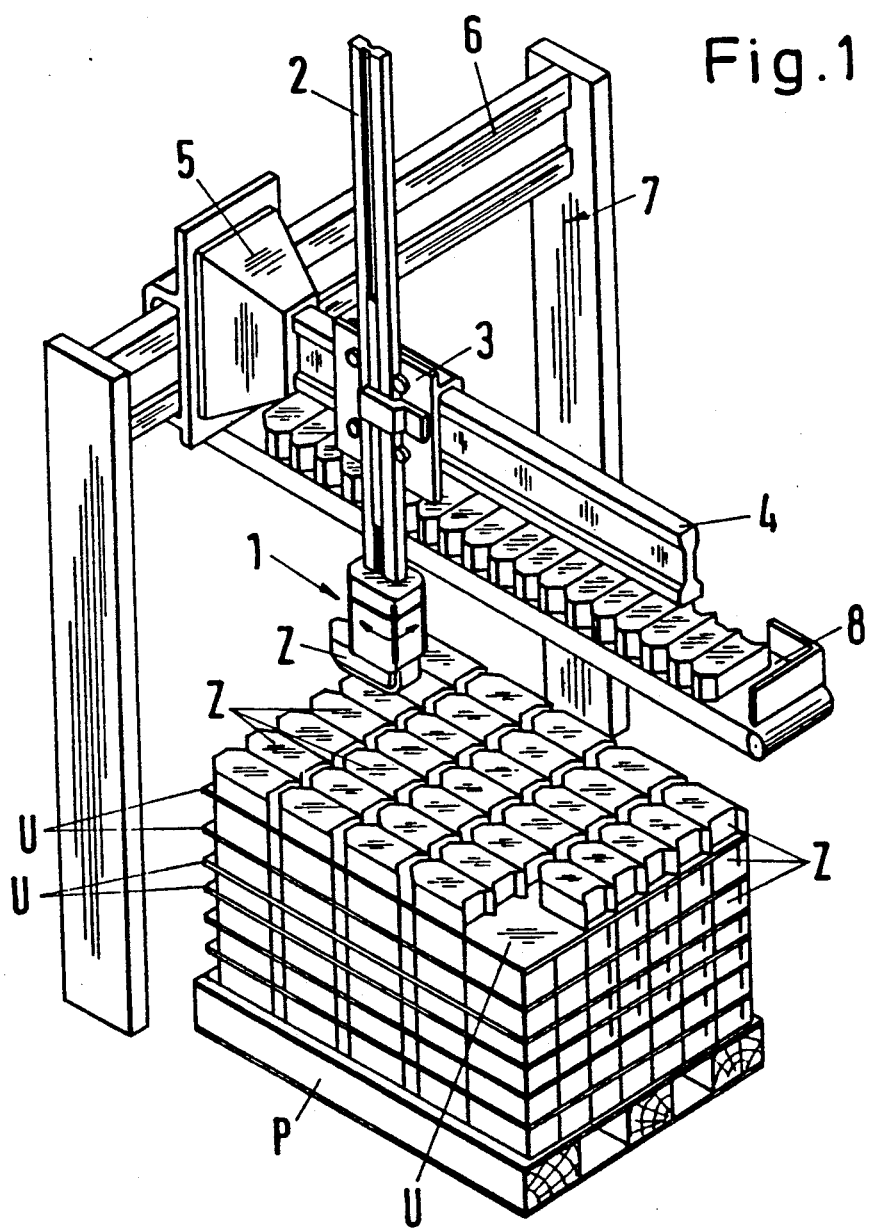
FIG. 1 is an isometric view of a pallet on which blanks are stacked as blocks, and is also a schematic illustration of one exemplary embodiment of the inventive unloading apparatus.

A first method of the present invention is characterized primarily in that the individual blocks of blanks are successively raised at least slightly from their respective support via an insertion tool, whereby the point of the insertion tool, which point is at least approximately positioned in a horizontal plane, is, immediately prior to the insertion process, to effect an exact positioning, supported in a vertical direction on a portion of the support that extends from the vertical insertion side of the block of blanks prior to introduction of the insertion tool, whereby subsequently the respective block of blanks is raised and transported away.

A further method of the present invention is characterized primarily in that a block of blanks disposed on the pallet at the outer edge of the entire stack is separated from its support by suction force, and subsequently an insertion tool is introduced below the respectively lowermost blank of the respective block of blanks, with this block of blanks subsequently being raised and transported away by the insertion tool. This inventive method is utilized when no portion of the support extends from the engagement side of the block of blanks, for which reason this inventive method is suitable only for blocks of blanks disposed on the pallet at the outer edge of the entire stack. After such a block of blanks has been removed, the rest of the blocks of blanks can be unloaded with the aid of an insertion tool that is supported on the support.

An alternative to the preceding method is characterized primarily in that a block of blanks disposed on the pallet at the outer edge of the entire stack can also be shifted from its support via insertion finger means that is introduced from above into spaces either of the block of blanks or between adjacent blocks of blanks prior to subsequently introducing an insertion tool underneath the respectively lowermost blank of the respective block of blanks, with this block subsequently being raised and transported away by the insertion tool.

Standard intermediate layers of paper, cardboard, or plastic can be used as supports for the blanks that are stacked as blocks on the pallets. However, in particular during interdepartmental transport, it is also possible to eliminate such intermediate layers and in place thereof to separate superimposed layers of blocks of blanks from one another by laterally staggering them or by turning them by 90 relative to one another, so that a blank of a lower block of blanks staggered or turned in this way forms the support for the block of blanks disposed thereabove.

To prevent the block of blanks that is to be removed from sliding during insertion of the insertion tool, it is proposed pursuant to a further feature of the present invention to apply to the respective block of blanks, prior to the insertion process, a pressure in a region remote from the insertion side to keep the block from being shifted by the insertion tool.

Pursuant to a further feature of the present invention, the exact positioning of the insertion tool in the vertical direction is effected by placing the point of the insertion tool on the respective support, and by a hereby generated slight relative movement of the point relative to the vertical adjustment movement of the entire insertion tool. In this connection, the application force of the point of the insertion tool upon the respective support, which force terminates the vertical adjustment movement of the insertion tool, can inventively be varied as a function of the state of the support and/or of the position on the pallet of the block of blanks that is to be removed.

Pursuant to one preferred specific embodiment of the inventive method, the respective block of blanks is transported away by the insertion tool, whereby during this transport the block of blanks is securely prevented from sliding on the insertion tool via a holding pressure.

Pursuant to the present invention, the individual blocks of blanks are deposited from the insertion tool onto a conveyer belt that is embodied as a temporary storage means, so that on the one hand short transport paths result between the insertion tool and deposition, and on the other hand when a pallet is exchanged, the subsequently arranged machine does not have to be shut down.

The inventive apparatus for unloading blanks of paper, cardboard, plastic, etc. that are stacked as blocks on the pallet is characterized primarily by a three-dimensionally controlled pick-up head on which an approximately horizontally oriented insertion tool is mounted so as to be slightly pivotable about a horizontal axis, with the pivot movement of the insertion tool in a downward direction being limited by a stop, and with the pivot movement thereof in the opposite direction being monitored by a switch lever that, via a switch, discontinues the downward movement of the pick-up head as soon as the insertion tool has been pivoted about a prescribed angle against an adjustable spring force.

This inventive construction of the unloading apparatus makes it possible, with slight technical expenditure, to have a functionally reliable unloading of blanks that are stacked as blocks on pallets without for this purpose having to use special intermediate layers or stack containers.

Pursuant to a further feature of the present invention, the spring force, which is exerted upon the insertion tool opposite to the lowering direction, is adjustable via an adjustment element, for example a solenoid or a pressure medium cylinder. In this way, the inventive unloading apparatus can, via straightforward means, be adapted not only to the respective conditions of the block of blanks and supports disposed on the pallet, but the possibility also exists for adapting the spring force in conformity with the respective layer of the actual block of blanks that is to be removed, for example as a function of the stability of the support at the respective removal location.

Pursuant to a further feature of the present invention, a movable pressure foot is disposed on the pick-up head beyond the region of movement of the insertion tool. By means of this pressure foot, it is possible to apply to the block of blanks that is to be removed a pressure that prevents the insertion tool from moving the block of blanks out of alignment.

To the extent that the insertion tool is simultaneously used to transport away the removed block of blanks for temporary storage or further processing, then pursuant to a further feature of the present invention, a movable holding foot is disposed on the pick-up head within the range of movement of the insertion tool; the holding foot prevents the respective block of blanks from sliding on the insertion tool.

In one preferred specific embodiment of the inventive apparatus, the insertion tool is disposed on a carrier plate that is mounted on the pick-up head in such a way as to be movable in a horizontal direction. Depending upon the configuration of the blanks that are to be processed, the insertion tool is embodied either as a tongue-like plate having a central point, or as a pronged plate having two or more points. The point or points are preferably bent slightly downwardly relative to the horizontal plate, and are respectively provided with a defined support surface, thus assuring that the insertion tool can reliably move under the lowermost blank of the respective block of blanks without the danger of damage occurring to the support.

In order, via suction force, to be able to separate, i.e. move up or raise, a block of blanks from its support, which block is disposed on the pallet on the outer edge of the entire stack, it is proposed pursuant to one specific embodiment of the present invention to dispose at least one suction means on the pick-up head to the side next to the insertion tool. In addition to the suction means, or in place thereof, insertion fingers can furthermore be disposed on the pick-up head to the side next to the insertion tool; these insertion fingers can be moved in a vertical direction relative to the insertion tool in order to shift blocks of blanks on the support, especially blocks disposed on the pallet at the outer edge of the entire stack. This is accomplished by introducing the insertion fingers from above into spaces that are either formed by an appropriate configuration of the blanks in a block or are produced between two adjacent blocks of blanks.

It is finally proposed pursuant to the present invention that the insertion tool be provided with at least one compressed air passage that opens out on the front side; the compressed air exiting from this compressed air passage facilitates the introduction of the insertion tool between the lowermost blank of the respective block of blanks and its support, and in so doing prevents damage.

Further specific features of the present invention will be described in detail subsequently.

Description of Preferred Embodiments

Referring now to the drawings in detail, shown in the overall view of FIG. 1 is a pallet P on which are stacked a number of blocks Z of blanks. Each block Z is made up of a specific number of blanks, for example blanks for cigarette packages or folding boxes. In the embodiment illustrated in FIG. 1, disposed between each layer of blocks Z of blanks is a support U in the form of an intermediate layer of paper or cardboard for separating the superimposed blocks Z of blanks from one another.

Thus, in the embodiment illustrated in FIG. 1 the intermediate layers form the respective supports U for the individual blocks Z of blanks. Alternatively, especially for interdepartmental transport, the respective support can be formed by having the blocks Z of blanks that are disposed in the individual layers on the pallet P be laterally staggered or turned by 90 relative to the block Z of blanks of the respectively adjacent layer. In this way also it is possible to achieve an exact separation of the superimposed blocks Z of blanks.

A pick-up head 1, which is shown only schematically in FIG. 1, is used to unload the blocks Z of blanks that are stacked on the pallet P. In the embodiment illustrated in FIG. 1, the pick-up head 1 is rotatably disposed at the lower end of a guide bar 2; this rotatability is indicated by the double arrow. The guide bar 2 is disposed on a travelling carriage 3 in such a way as to be movable in a vertical direction. The carriage 3, in turn, is movably disposed on a horizontal support beam 4 that in turn is disposed on a carriage 5 that can be moved on the horizontally extending crossbar 6 of a gantry 7. In this way, by moving the carriage 5 as well as the travelling carriage 3, it is possible to position the pick-up head 1 in a horizontal direction, with this positioning being effected, for example, with the aid of photocells and hence enabling a control that is independent of the respective blank size. An adjustment in the horizontal direction is effected by displacing the guide bar 2 on the travelling carriage 3. Finally, alignment of the pick-up head 1 can be undertaken by turning the pick-up head relative to the guide bar 2.

FIG. 1 indicates that a block Z of blanks that has been removed from the pallet P with the aid of the pick-up head 1 is, after being raised, conveyed to a conveyer belt 8 that runs within the gantry 7 and feeds the individual blocks Z of blanks either directly to a further processing unit, for example a cigarette packaging machine or a folding box gluing machine, or for temporary storage. Of course, the blocks of blanks that are removed from the pallet P can also be transported away in another manner.

Figure 2:
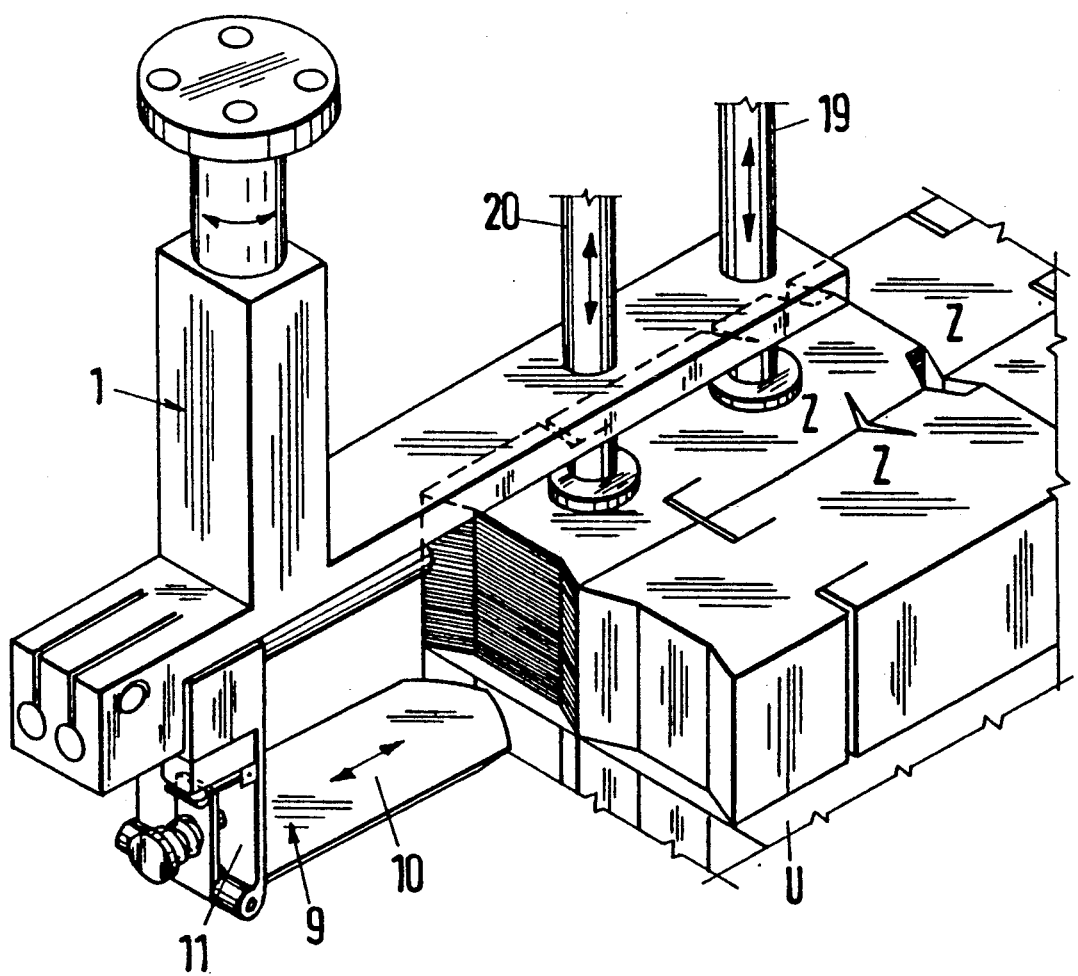
FIG. 2 is an isometric detailed view of a first exemplary embodiment of the pick-up head of the inventive unloading apparatus.

A first exemplary embodiment of the inventive pick-up head 1 is illustrated in FIGS. 2 to 6. FIG. 2 is an isometric view showing the three-dimensionally controlled, movable pick-up head 1, on which is disposed an approximately horizontally oriented insertion tool 9 that is illustrated in detail in FIGS. 3 to 6.

With this embodiment, the insertion tool 9 is formed by a tongue-like plate 10 that has a central point 10a. This point 10a is bent slightly downwardly relative to the horizontally extending plate 10 and is provided with a definite supporting surface 10b so that the insertion tool 9 can be precisely placed upon a support U before the plate 10, via horizontal movement relative to the pick-up head 1, can be introduced underneath the respective block Z of blanks that is to be removed.

In the embodiment illustrated in FIG. 3, the tongue-like plate 10 is disposed on a carrier plate 11 that is mounted on the pick-up head 1 in such a way as to be movable in the horizontal direction, as can be seen in particular from FIG. 2. The plate 10 can be pivoted slightly relative to the carrier plate 11 about a journal means 12, which forms a horizontal axis. The pivoting movement is limited in the lowering or downward direction of the plate, i.e. in a counterclockwise direction in FIG. 3, by a stop that is formed by a screw 13 which rests against the carrier plate 11. This screw 13 is disposed in a switch lever 14 that is secured to the upper side of the plate 10 and extends upwardly at approximately right angles. Additionally attached to the switch lever 14 is a tension spring 15 that pulls the screw 13 against the carrier plate 11 and hence holds the plate 10 in the horizontal, possibly slightly downwardly inclined normal position. Only after the supporting surface 10b of the point 10a of the plate 10 rests upon a support U, is a slight pivoting of the plate 10 (in a counterclockwise direction in the view of FIG. 3) effected against the force of the tension spring 15. This pivoting movement is monitored by proximity switches 16a, 16b, with the proximity switch 16a serving to terminate the lowering movement of the pick-up head 1 as soon as it has become free, and the proximity switch 16b being used to initiate a slight return movement in the event that the intermediate position between the two proximity switches 16a, 16b is overrun.

In order to be able to change the magnitude of the bearing or support force, which leads to a pivoting of the plate 10 and hence to termination of the vertical lowering movement of the pick-up head 1, one end of the tension spring 15, as shown in FIG. 3, can be disposed on an adjustment element, such as a solenoid 17; by actuating the adjustment element, the initial stressing force of the spring 15 can be altered.

Figure 5:
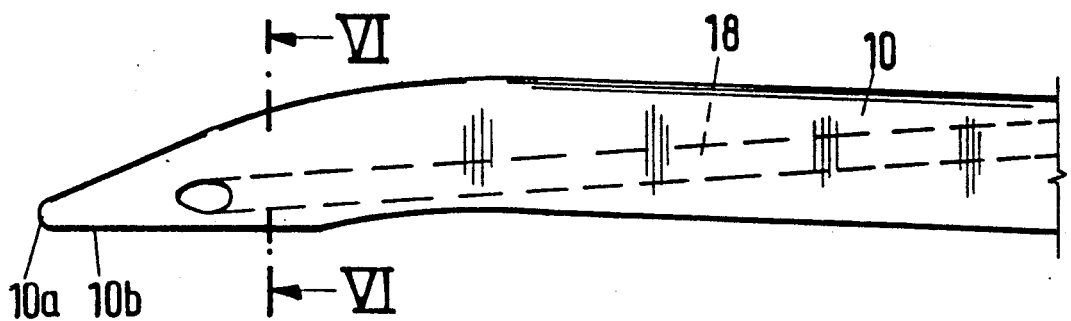
FIG. 5 is a side view of the insertion tool portion of FIG. 4.
Figure 4:
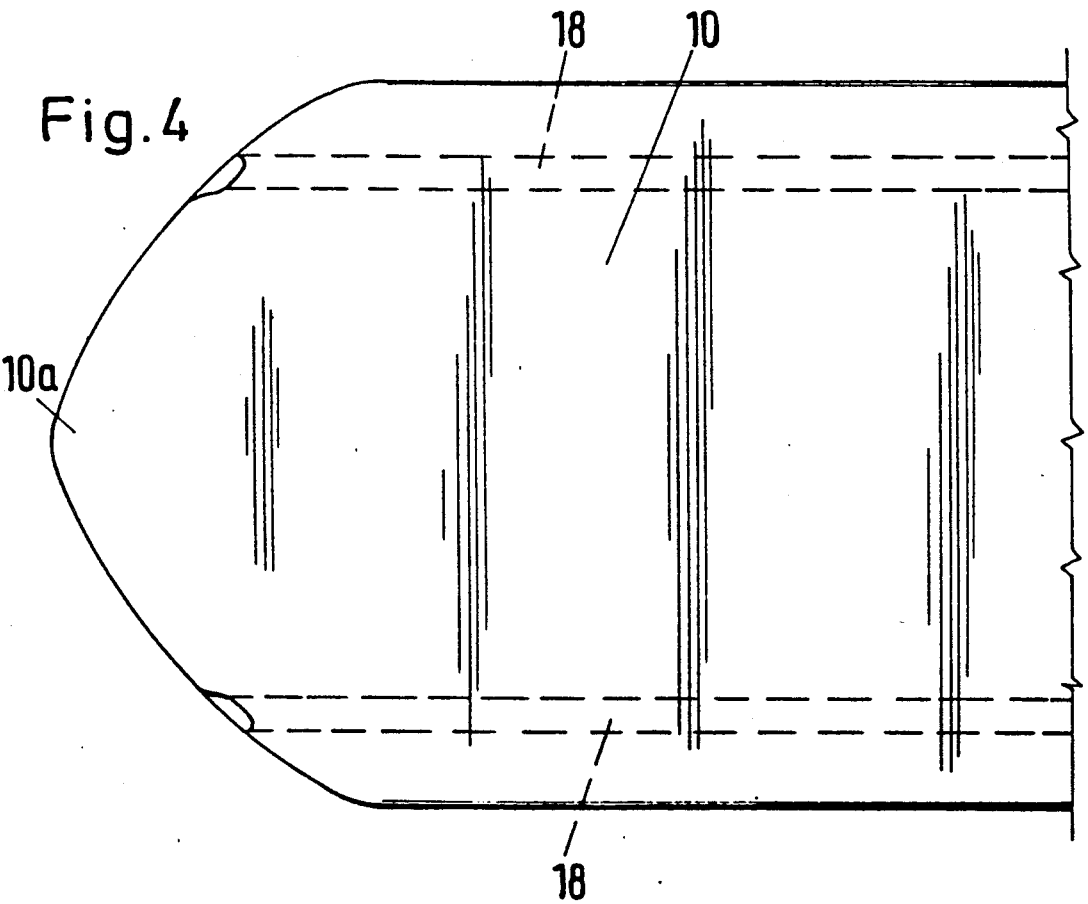
FIG. 4 is a plan view of the forward portion of an insertion tool taken in the direction of the arrow IV in FIG. 3.
Figure 6:
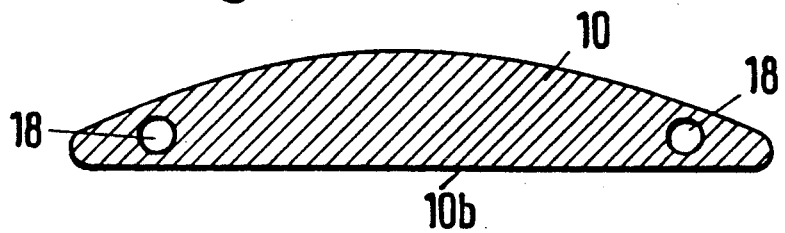
FIG. 6 is a cross-sectional view taken along the line VI—VI in FIG. 5.

In order to facilitate entry of the point 10a of the tongue-like plate 10 between the support U and the respectively lower blank of the block Z of blanks, the plate 10, as shown in FIGS. 4 to 6, can be provided with one or more compressed air passages 18 that open out at the front side of the plate 10 and via which the emerging compressed air facilitates the insertion process of the plate 10.

An unloading process will now be explained with the aid of FIGS. 1 and 2, and in particular in connection with blanks for hard cigarette packages.

By means of the insertion tool 9, the blocks Z of blanks that are stacked on the pallet P are successively lifted up from their respective support U, for which purpose the pick-up head 1 is first at least approximately positioned in a horizontal plane above the pallet P by moving the travelling carriage 3 and the carriage 5 in such a way that the point 10a of the plate 10 of the insertion tool 9 is disposed laterally above the block Z of blanks that is to be removed. In so doing, care must be taken that the point 10a of the plate 10, during a subsequent lowering movement of the pick-up head 1, arrives at the support U that extends beyond the vertical insertion side of the block Z of blanks that is to be removed, as shown in particular in FIG. 2. This extension of the support U beyond the freely accessible side of the block Z of blanks results, for example, from the appropriate configuration of the blanks. Since the edges of the approximately trapezoidal extension of the support U are supported on the block Z of blanks disposed therebelow, even thin intermediate layers, for example of paper, suffice to form the appropriate support U.

As a result of the support of the point 10a of the insertion tool 9 on the support U, there results a signal for an exact positioning of the plate 10 in a vertical direction, whereby the vertical lowering movement of the pick-up head 1 is terminated as soon as the plate 10, the supporting surface 10b of which rests upon the support U, has overcome the force of the tension spring 15 and has carried out a prescribed pivoting movement, so that the proximity switch 16a is actuated by being released. In this defined position, the carrier plate 11 that carries the insertion tool 9 is now introduced, by a horizontal relative movement relative to the pick-up head 1, between the support U and the lowermost blank of the block Z of blanks, so that the block Z comes to rest upon the plate 10. This block Z of blanks can subsequently be raised from the support U via the insertion tool 9 and can be transported away, for example by being supplied to the conveyer belt 8 shown in FIG. 1.

In order during insertion of the insertion tool 9 to prevent a slipping of the block Z of blanks, in the illustrated embodiment a movable pressure foot 19 is disposed on the pick-up head 1 beyond the zone of movement of the insertion tool 9. This pressure foot 19 holds the respective block or stack Z of blanks securely in position on the support U during introduction of the insertion tool in the form of the plate 10. In order not to obstruct this introduction, the pressure foot 19 is disposed beyond the zone of movement of the plate 10.

So that the block Z of blanks is securely held upon the plate 10 during the subsequent raising of the block, there is furthermore disposed on the pick-up head 1 a holding foot 20, which is disposed within the zone of movement of the plate 10 so that after the insertion process, the holding foot 20 securely holds the respective block Z of blanks between the plate 10 and the holding foot 20.

By means of an appropriate movement of the guide bar 2 relative to the travelling carriage 3, of the carriage 3 on the support beam 4, and of the carriage 5 on the crossbar 6, there is subsequently effected a transfer of the block Z of blanks that has been lifted from the pallet P onto the conveyer belt 8. Here also the pressure foot 19 can be extended in order to securely hold the respective block Z of blanks in place on the conveyer belt 8 when the plate 10 is withdrawn from below the block Z of blanks via a relative movement of the carrier plate 11 relative to the pick-up head 1, in which connection it is to be understood that the holding foot 20 was previously raised from the upper side of the block Z. Also in this connection the deposition movement, expediently by travel of the plate 10 relative to the carrier plate 11, is interrupted by signals from the proximity switches 16a and 16b.

The important thing with the previously described unloading process is that the point 10a of the insertion tool 9 that includes the plate 10, which point is at least approximately positioned in a horizontal plane, is, immediately prior to initiation of the insertion process, for the purpose of precise positioning, supported in a vertical direction upon the support U that projects from the vertical insertion side of the block Z of blanks. As a consequence of this support, there is provided in a straightforward manner an exact positioning in the vertical direction, whereby the support force of the point 10a upon the support U is only slight. Since the support force is produced by a slight lowering of the insertion tool 9 relative to the support U, and leads to a slight relative movement of the point 10a relative to the vertical positioning movement of the entire insertion tool 9, this pivoting movement can be utilized for terminating the vertical lowering of the entire pick-up head 1, for example with the aid of the construction illustrated in FIG. 3.

Figure 7:
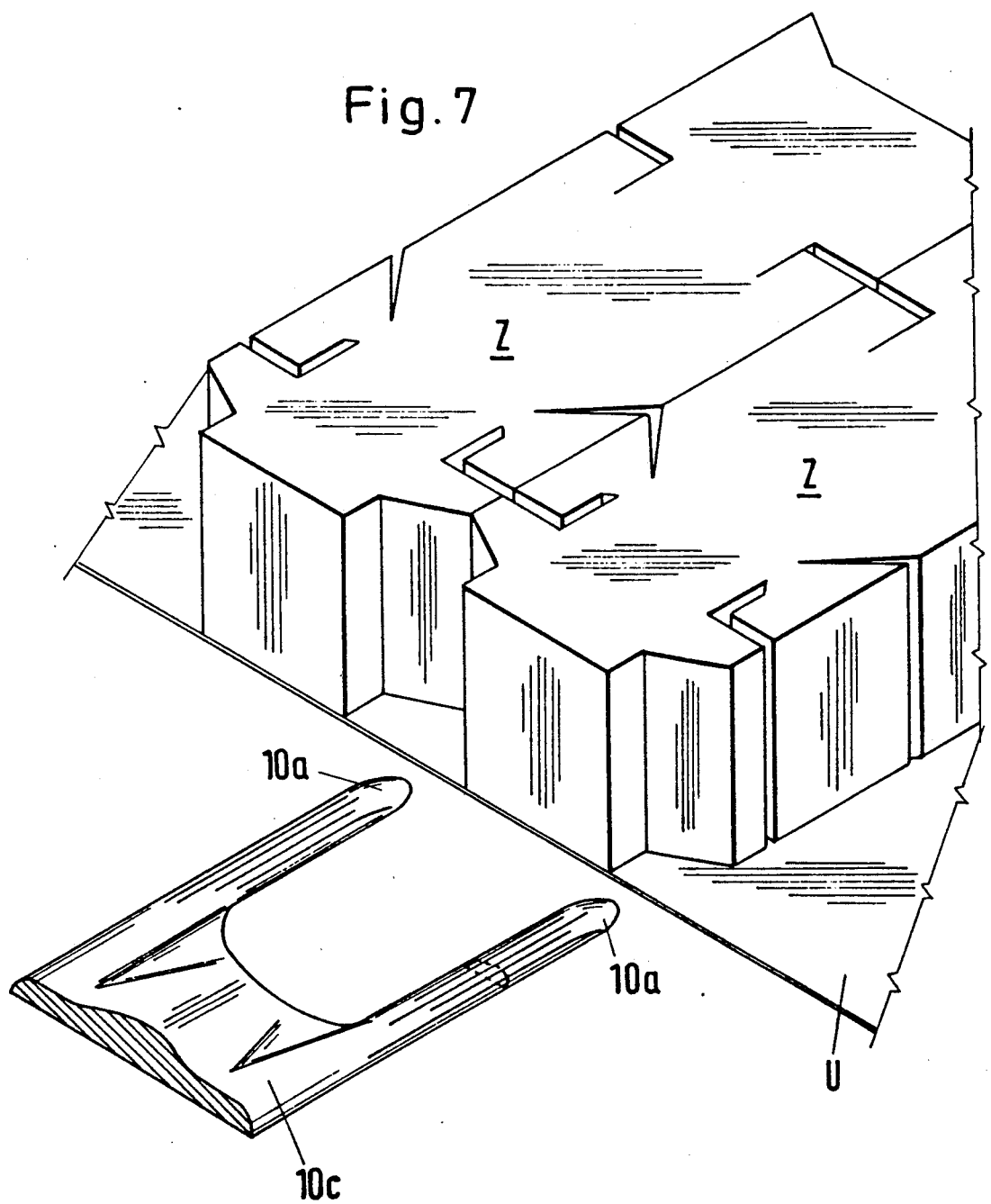
FIG. 7 is an isometric view of a modified embodiment of the inventive insertion tool.

FIG. 7 shows a modified embodiment of the actual insertion tool 9, which in this embodiment has a pronged plate 10c with two points 10a. By means of these two points 10a, the plate 10c is supported on the support U laterally next to a projecting portion of the block Z of blanks. This points out that the actual configuration of the insertion tool 9 can readily be coordinated with the respective shape of the blanks without deviating from the overall concept of the present invention.

Figure 8:
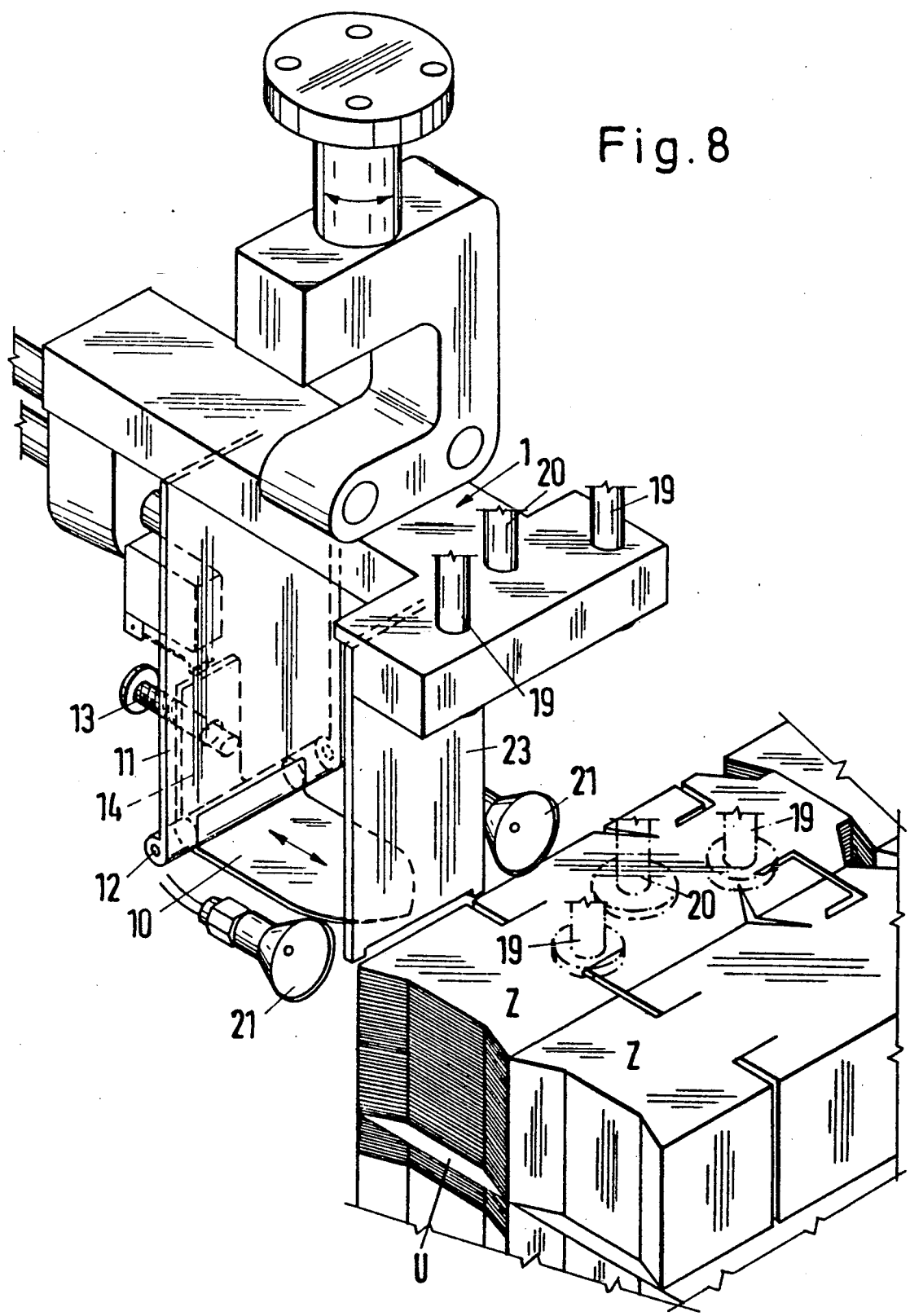
FIG. 8 is an isometric view of a second exemplary embodiment of a pick-up head of the inventive unloading apparatus.

Since it may be expedient or necessary to remove the respectively first block Z of blanks of each of the layers disposed on the pallet P from a side on which the support U does not project beyond the vertical insertion side of the block Z of blanks, the pick-up head 1, pursuant to the alternative embodiment illustrated in FIG. 8, can be provided with at least one suction means 21 to the side next to the insertion tool 9. With the aid of these suction means 21, the block Z of blanks that is respectively disposed on the outer edge of the total stack on the pallet P is separated from its support U, in other words is moved up so that subsequently the insertion tool 9, for example in the form of a plate 10, can be introduced below the respectively lowermost portion of the respective block Z of blanks, whereupon subsequently the respective block Z of blanks is raised and transported away. To align a block Z of blanks that has possibly slid, a plate 23 can be disposed between the suction means 21, with this plate 23 being moved against the blanks prior to the suction process to align the blanks.

As can be seen from the embodiment illustrated in FIG. 8, the suction means 21 can be provided in addition to the aforementioned structural elements of the pick-up head 1, so that the two previously described methods for unloading can be carried out alternatively with the already described apparatus. FIG. 8 shows that also with this modified construction, the pick-up head 1 can in this case be provided with a pair of pressure feet 19 and a holding foot 20 in order on the one hand to prevent an undesired sliding of the block Z of blanks during the moving-up process via the suction means 21, during movement of the pick-up head, and during insertion of the plate 10, and on the other hand to assure a reliable fixation of the separated block Z of blanks on the insertion tool 9. The suction means 21 are moved out of the operating position illustrated in FIG. 1 when the pick-up head 1 operates in the aforementioned manner.

Figure 9:
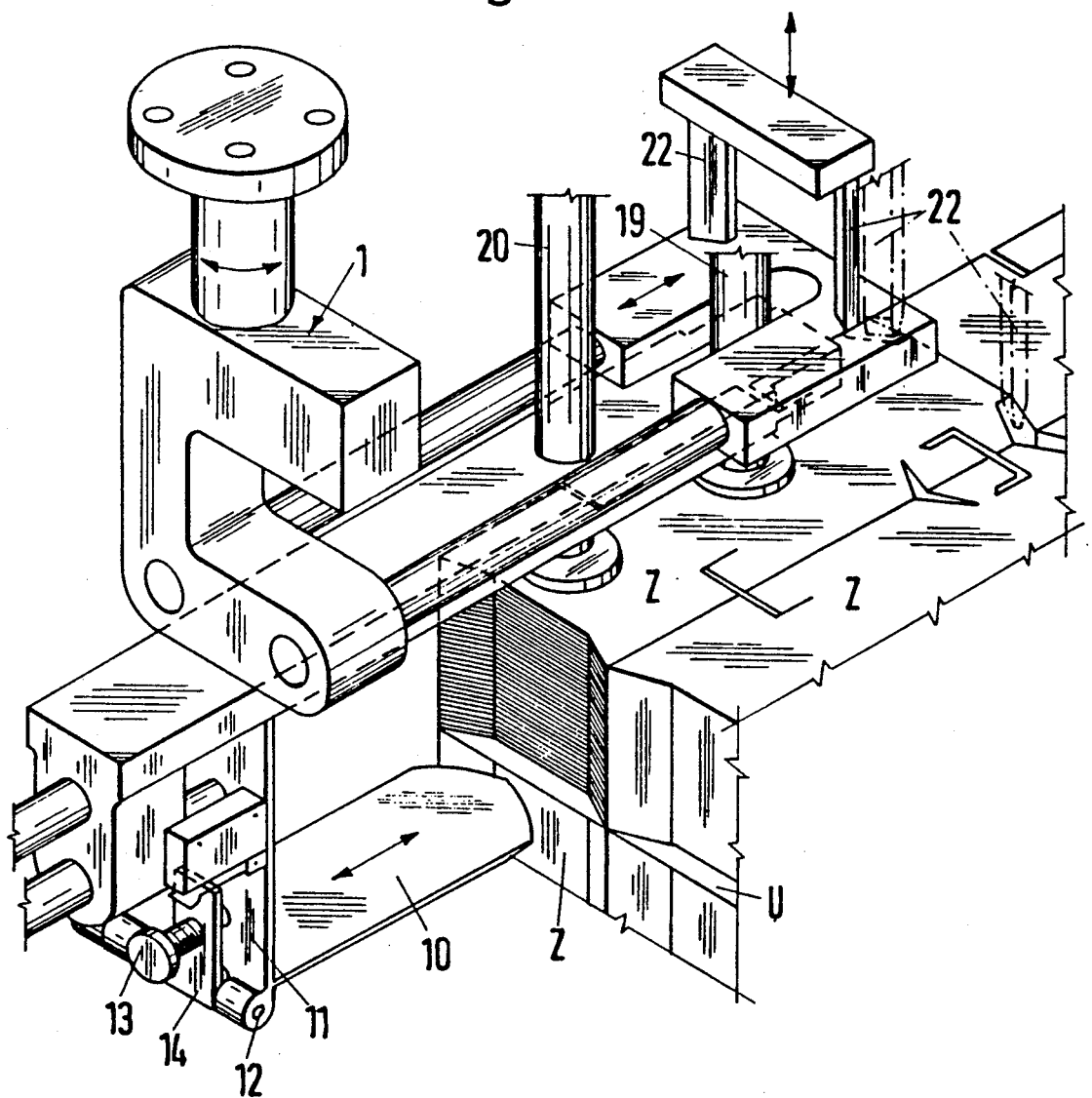
FIG. 9 is an isometric view of a further exemplary embodiment of a pick-up head of the inventive loading apparatus.

An alternative embodiment to the construction illustrated in FIG. 8 is shown in FIG. 9. In this embodiment, in place of the suction means 21 insertion fingers 22 are disposed on the pick-up head 1, and can be moved in a vertical direction relative to the insertion tool 9. The insertion fingers 22 can be introduced from above into spaces that are either formed in the actual block Z of blanks in conformity with the configuration of the blanks or are produced between adjacent blocks Z of blanks. In FIG. 9, the insertion fingers 22 are indicated by dot-dash lines in a position prior to their insertion in appropriate spaces between adjacent blocks Z of blanks. The insertion fingers 22 are subsequently shifted in a horizontal direction either along with or relative to the pick-up head 1, so that the block Z of blanks disposed on the edge of the pallet P is moved up from the support U. The plate 10 of the insertion tool 9 can now be guided from below under the respectively lowermost blank of the slightly moved-up block Z of blanks in order to grasp the same, single it out, and transport it away. Also in this case pressure and holding feet 19 and 20 are provided in order to assist with the singling out and transporting away processes.

The present invention is, of course, in no way restricted to the specific disclosure of the specification and drawings, but also encompasses any modifications within the scope of the appended claims.

What we claim is:

1. An apparatus for unloading blanks that are stacked as blocks on a support on a pallet and that are subsequently supplied as blocks of blanks for further processing or temporary storage, said apparatus comprising:

a three-dimensionally controlled pick-up head;

an approximately horizontally oriented insertion tool pivotally mounted on said pick-up head for pivotal movement about a horizontal axis;

pivot means for mounting said insertion tool to said pick-up head;

a switch lever fixed to said insertion tool and pivotal therewith;

stop means disposed on said switch lever for limiting pivotal movement of said insertion tool in a downward direction;

a spring disposed between said pick-up head and said switch lever, said spring providing a spring force for biasing said switch lever toward said pick-up head; and switch means actuatable by movement of said switch lever so as to discontinue a downward movement of said pick-up head when said insertion tool has been pivoted about a prescribed angle against said spring force.

2. An apparatus according to claim 1, further comprising adjustment means for adjusting said spring force that is acting against said insertion tool in a direction opposite to said downward movement of said pick-up head.

3. An apparatus according to claim 2, wherein said adjustment means comprises a solenoid.

4. An apparatus according to claim 1, further comprising a movable pressure foot means disposed on said pick-up head beyond a range of movement of said insertion tool.

5. An apparatus according to claim 4, further comprising a movable holding foot means disposed on said pick-up head within said range of movement of said insertion tool.

6. An apparatus according to claim 1, further comprising a carrier plate that is mounted on said pick-up head and movable in a horizontal direction, with said insertion tool being mounted to said carrier plate.

7. An apparatus according to claim 1, wherein said insertion tool comprises a tongue-shaped plate having a central point.

8. An apparatus according to claim 1, wherein said insertion tool comprises a pronged plate having at least two points.

9. An apparatus according to claim 1, wherein said insertion tool comprises an essentially horizontal plate that is provided with point means that bend slightly downwardly relative to said plate, with said point means being provided with defined support surface means.

10. An apparatus according to claim 1, further comprising insertion finger means disposed on said pick-up head adjacent to said insertion tool, with said insertion finger means being movable in a vertical direction relative to said insertion tool.

11. An apparatus according to claim 1, wherein said insertion tool is provided with at least one compressed air passage which opens out on a front edge of said insertion tool.

12. An apparatus according to claim 1, further comprising at least one suction means for separating from a respective one of said supports, via suction force, a block of blanks that is disposed on said pallet at an outer edge of an entire stack of said blocks of blanks.

13. An apparatus according to claim 12, wherein said suction means is disposed on said pick-up head adjacent to said insertion tool.

* * * * *